United States Patent
Schulz et al.

(10) Patent No.: US 6,168,656 B1
(45) Date of Patent: Jan. 2, 2001

(54) PIGMENTED INKJET INK WITH IMPROVED ANTI-WETTING PROPERTIES

(75) Inventors: Matthias Schulz, Hinteregg; Nicole Howald, Jona; Thomas Griebel, Hünenberg, all of (CH)

(73) Assignee: Pelikan Produktions AG, Egg (CH)

( * ) Notice: Under 35 U.S.C. 154(b), the term of this patent shall be extended for 0 days.

(21) Appl. No.: 09/219,073

(22) Filed: Dec. 22, 1998

(30) Foreign Application Priority Data

Dec. 23, 1997 (DE) .............................................. 197 57 690
Aug. 5, 1998 (DE) .............................................. 198 35 397

(51) Int. Cl.$^7$ .................................................. C09D 11/02
(52) U.S. Cl. ..................................... 106/31.75; 106/31.66; 106/31.85
(58) Field of Search ............................... 106/31.75, 31.85

(56) References Cited

U.S. PATENT DOCUMENTS

| | | | |
|---|---|---|---|
| 4,783,220 | * 11/1988 | Gamble et al. | 106/31.58 |
| 4,963,652 | * 10/1990 | Tortorici et al. | 524/605 |
| 4,973,519 | * 11/1990 | Tortorici et al. | 428/411.1 |
| 5,626,654 | * 5/1997 | Breton et al. | 106/31.33 |
| 5,633,109 | * 5/1997 | Jennings et al. | 106/31.34 |
| 5,788,749 | * 8/1998 | Breton et al. | 106/31.75 |
| 5,911,816 | * 6/1999 | Gore | 106/31.75 |
| 5,913,971 | * 6/1999 | Fujimatsu et al. | 106/31.86 |

* cited by examiner

Primary Examiner—Helene Klemanski
(74) Attorney, Agent, or Firm—Fay, Sharpe, Fagan, Minnich & McKee, LLP

(57) ABSTRACT

Description of an inkjet ink for application in inkjet printers, comprising (a) a solvent, which contains at least 80% of a homopolar, non-watery solvent, (c) one or several phospholipides. In such inkjet inks, the phospholipides have a stabilizing effect. In some applications it may be beneficial with respect to certain pigments to employ an additional dispersant. The inkjet ink has, with concurrent high dispersing stability, significantly improved de-wetting property, with high optical density and excellent storage stability on a nozzle plate of an inkjet print head.

12 Claims, No Drawings

PIGMENTED INKJET INK WITH IMPROVED ANTI-WETTING PROPERTIES

The present invention concerns a pigmented inkjet ink with improved anti-wetting properties.

A distinction is made between two types of ink which are employed for so-called inkjet printers (inkjet print). Involved are, on the one side, inks where the coloring substance is dissolved as a dye in a solvent, on the other side, dispersed inks, where the coloring agent is dispersed in a dilution agent in the form of a pigment.

Depending upon the material to be printed or the printing method to be employed (continuous or drop-on-demand) (DOD) method, the ink properties must satisfy certain criteria, such as required invariability of ink, high degree of endurance and optical density and similar. In order to meet these specifications, pigmented inks are being employed in increasing measure for improvement of print quality.

Pigmented inks on the basis of high-boiling aliphatic hydrocarbons are less likely to clog the inkjet nozzles, since they do not dry up in the nozzle area during stops in printing.

They can be reliably employed on porous substrates because of quick migration and their water-proof behavior. Such inks are not electrically conductive and have a non-corrosive effect upon the metal components of the print head.

In order to increase the stability of these dispersions, preferential use is made of ionic dispersants such as macro-molecular, poly-ionic compounds from poly or oligomer systems with acid or alkaline groups as repetitive structural units. Such dispersants are also specifically employable with non-watery or essentially non-watery inks. Polyesteramines are known for example as dispersants with acid or alkaline groups, such as SOLSPERESE (brand name of the Zeneca colors) and EFKA (polyamine dispersant, brand of Efka Chemicals).

It has been shown the aforementioned dispersants, specifically with respect to the polyamine-aliphatic acid condensates that they have a skin and eye irritation effect when used as dispersants in the specified inks. In addition, during storage, raw material and ink release ammonia. As a rule, addition of another additive is required, which prevents wetting of the print head nozzle plates in the inkjet printers, but which has a detrimental effect upon the dispersion stability.

Solvents employed in non-watery pigmented inks comprise, aside from polar solvents, also homopolar solvents, such as aliphatic hydrocarbons, for example EXXSOL (brand name of Exxon Chemical GmbH, Cologne for a fraction from distillation of natural or synthetic hydrocarbon mixtures) or aromatic hydrocarbons, for example SOLVESSO (brand name of Exxon Chemical GmbH for aromatic compounds) as well as their mixtures in long-chained alcohols, esters and ethers, commonly used are homopolar solvents with at least six carbon atoms.

From DE 197 26 043, a pigmented ink is known of at least 80% homopolar solvent with therein dispersed pigment and also one co-polymer of vinyl-pyrrolidone with one or several long-chained alpha-olefins having at least 6 carbon atoms. This ink, however, does not always have totally satisfactory anti-wetting properties.

With the use of such inks in inkjet printers, problems occur in such manner that a portion of the ejected droplets is split off and collects in the area surrounding the jet plate.

While it is true that the ink is able to flow back into the nozzle and become part of the next ejected ink drop, there forms, however, when stops in printing are reduced and with increased ink expulsion frequency, more ink residue that can flow back, which then accumulates on the nozzle plate. Even worse is the formation of a cohesive ink film on the nozzle plate, which obstructs the nozzles. The drops cannot be propelled through this film. The printing process fails.

In order to achieve an improvement in the anti-wetting property of the ink on the nozzle plate, it is possible to apply a so-called de-wetting coating or anti-wetting coating on the surface of the nozzle plate, which is formed, for example, of fluorocarbon or fluo-silane. The above mentioned problems can be reduced by this coating. Formation and run off of ink droplets is improved, but essential improvement of the anti-wetting behavior of the ink is not yet obtained in sufficient measure.

Another problem occurs with providing multi-colored images by inkjet print, because an accumulation of ink on the surface of the nozzle plate may lead, with further expulsion of ink, to mixing together or running together of different colored inks.

One possibility of diminishing the surface wetting of the nozzle plate by the ink is the addition of a compound which will neutralize the acid or alkaline groups of the dispersant in the ink in such quantity that will not destabilize the dispersion. This neutralization prevents the ink from accumulating on the nozzle plate, with concurrent increase in the run-off speed of the drops on the nozzle plate surface. The neutralizing agent can be a small molecule or a polymer. If the dispersant is a polyamine, an acid is employed as a neutralizing agent. Examples for this are organic carbonic acids, such as acetic or citric acid, organic sulfonic acids, phenols or novolaks, such as Uravar FN5. If the dispersant contains acid groups, the neutralizing agent is appropriately an amine. Preferred as solvents are homopolar organic solvents and compounds with small amounts of polar solvents. Such inks are described in WO 97/15633.

The known inks, however, have a number of drawbacks. The employed dispersants and additives irritate the eyes, the skin and the mucous membranes.

Furthermore, the dispersion stability of the known inks on the basis of homopolar hydrocarbons is not sufficient, since the addition of further additives it is possible to improve other properties, such as the anti-wetting property of the ink, but, at the same time, there is a decrease in the stability of the dispersion phase of the ink. With extended storage, this may lead to inhomogeneities and sediment formation.

The invention is therefore based on the object of making available an ink for use in inkjet printers which has the indicated drawbacks of the state of the art to only a reduced extent, which specifically demonstrates improved dispersion stability, even with extended storage, and which has, at the same time, improved anti-wetting capability of the homopolar pigmented ink on the nozzle plate of an inkjet print head. Furthermore, the anti-wetting additive should have no toxic properties, specifically it should not be irritating to the skin and eyes. In addition, such ink should permit the beneficial imprinting of absorbent materials, such as paper and cardboard, with excellent functional capability.

According to the invention, this object is solved by an inkjet ink containing:
  a) a solvent which has at least 80% of a homopolar, non-watery solvent.
  b) a pigment dispersed in the solvent, and
  c) one or several phospholipides.

Consequently, necessary components of the inkjet ink according to the invention are: solvents, pigments and one or several phospholipides.

It has now been shown, quite unexpectedly, that the addition of at least one phospholipide to the pigmented inkjet ink clearly improves the anti-wetting property of the ink. This behavior might be attributed to the amphiphilic properties of the phospholipides. Phospholipides have special properties based on their hydrophilic head group and their hydrophobic aliphatic acid chain.

The phospholipides can form so-called liposomes—mostly spherical structures with a double membrane from the lipid molecules, whereby the lyophilic portions of the molecule point toward the interior of the liposome and form its surface, while the lyophobic portions of the molecule in the membrane point towards each other. Within the scope of the invention, such vesicles are very well suited for encapsulations of pigment particles and therefore act not only as anti-wetting additive but also as stabilizer.

Phospholipides occur in all animal and vegetable food items and belong to the complex lipides which are subdivided into the sphingo-phospholipides and glycero-phospholipides.

Most of the phospholipides are derivatives of glycerine as hydrophilic component and are also designated as phospho-glycerides or phosphatides (the latter was previously employed for all phospholipides). The glycero-phospholipides are classified into lecithines, kephalines, cariolipines, phosphatidyl inosite and phosphatidyl inosite phosphates.

The four most important phospholipides are:
1) phosphatidyl choline (PC),
2) phosphatidyl ethanolamine (PE),
3) phosphatidyl inosite (PI), and
4) phosphatide acid (PA).

Their structure is as follows:
1) phosphatidyl choline (PC) is the most frequency occurring phospholipide. It is a known O/W-emulsifier and liposome developer and has a dipolar ionic structure with a positive and a negative charge, which neutralize each other toward the outside. The general chemical formula for phosphatidyl choline is:

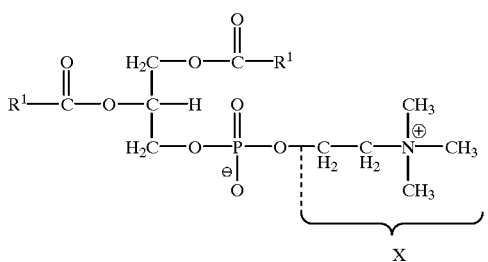

Formula (I)

in which $R_1$ and $R_2$ typically signify linear aliphatic rests with 15 or 17 carbon atoms with up to 4-cis dual compounds and X representing the choline rest.

2) phosphatidyl ethanolamine (PE) has, in comparison with phosphatidyl choline, a small head group and has the structure represented in Formula (I) with X=2-aminoethanol. Phosphatidyl ethanolamine is a good co-emulsifier with the above described di-polar ionic structure.

3) the single negative charged phosphatidyl inosite (PI) has a large hydrophilic head group and forms bivalent ionic salts. The structure of phosphatidyl inosite corresponds to Formula (I) with X=inosite.

4) phosphatide acids (PA) are dual negative charged phospholipides, which form salts with bivalent ions in water, and which have a structure according to Formula (1) with X=H.

The individual phosphatidyl derivatives thus differ from a chemical aspect by the functional groups of phosphoric acid and thus by charge and polarity. Despite different structures and properties as additive in the ink according to the invention, they have a significantly improved anti-wetting capability.

The ink according to the invention may also contain as anti-wetting additive several mixed phospholipides, for example in form of a lecithin. Lecithin, which belongs to the category of glycero-phospholipides, is not just one single substance, but is composed of a mixture of several phospholipides, which depending upon the biological starter material, (for example vegetable seed cells, vegetable fats or soy beans) are present in different quantitative proportions.

The previously customary use of the term "lecithin" for phospatidyl choline (PC) alone is not appropriate. In industry a mixture of lecithins and kephalines is normally called "lecithin" whereby the term "lecithin" may also signify the sum of all phospholipides contained in a food product. In the present invention, the term "lecithin" is to be understood as a mixture of several phospholipides having different chemical structures and thus differing functionalities.

A soy-lecithin may be composed, for example, of 71% phospholipides and other components: 24% phophatidyl choline/lysophosphatidyl choline, 21% phosphatidyl ethanolamine/acyphosphatidyl ethanolamine/lysophosphatidyl ethanolamine; 15% phosphatidyl inosite; 7% phosphatide acid and 4% other phospholipides as well as 16% glycolipides, 8% carbohydrates, 3% neutral lipides, 1% mineral substances and 1% water.

Within the framework of the invention, a mixture of phospholipides also includes phospholipide fractions with differently enriched phospholipides, obtained from different preparation processes. The preparation of a complex lecithin mixture as specified above, for example, is done, worldwide, according to the patented NATTERMANN process from standardized native soy-lecithin by means of ethanol as sole extraction agent and by chromatography on silica gel. These phospholipide-enriched lecithin fractions having different functionalities are also called nathines. They are liposome developers, emulsifiers and synergism substances of different composition and differ from each other in the PL-ratio.

The compositions of some nathine-phospholipides are listed in the following table:

TABLE I

Fractionated Lecithins

| Lecithin | PC-enriched alcohol-soluble fraction | | PI/PA-enriched alcohol-insoluble fraction | | PE-enriched alcohol-soluble fraction | | Native Lecithins for comparison standardized Soy-lecithins |
|---|---|---|---|---|---|---|---|
| Quality Brand | Nathine 130 | Nathine 140 | Nathine 3-F | Nathine 3-KE | Nathine 5-F | Nathine 5-KE | Sternprime N-10 |
| phys. condition | thick-fluid | paste-like | liquid | de-oiled powder | liquid | de-oiled powder | liquid |
| insoluble in acetone (AU) | 65 | 70 | 62 | 97 | 40 | 97 | 62 |
| Phospholipids *) | 45 | 63 | 42 | 64 | 30 | 65 | 45 |
| PC/LPC | 32 | 47 | 5 | 8 | 5 | 11 | 16 |
| PE/APE/LPE | 10 | 11 | 14 | 21 | 14 | 29 | 13 |
| PI | 1 | 2 | 12 | 18 | 5 | 11 | 10 |
| PA | 1 | 2 | 9 | 14 | 4 | 9 | 4 |
| other PL | 1 | 1 | 2 | 3 | 2 | 5 | 2 |
| Glycolipides | 10 | 6 | 12 | 20 | 10 | 20 | 11 |
| carbohydrates | 5 | 3 | 5 | 9 | 5 | 9 | 5 |
| neutral lipides | 38 | 27 | 39 | 4 | 53 | 3 | 37 |
| minerals | 1 | — | 1 | 2 | 1 | 2 | 1 |
| water | 1 | 1 | 1 | 1 | 1 | 1 | 1 |

*)average value determined according to 31-P-NMR Spectroscopy
PC: Phosphatidyl choline
APE: Acylphosphatidyl ethanolamine
PA: Phosphatide Acid
LPC: Lysophosphatidyl choline
LPE: Lysophosphatidyl ethanolamine
PL: Phospholipides
PE: Phosphatidyl ethanolamine
PI: Phosphatidyl inosite The normally known basic components of the phospholipides, such as PC, PE, PI and PA are encountered with varying contents in the different nathine types, i.e., one or several phospholides is or are being enriched.

Surprisingly, the nathine-phospholipides, which reduce as border-surface active substances the border surface tension between two non-mixable liquids and thus stabilize an emulsion, also have a stabilizing effect in colloidal-disperse systems. In addition, they bestow upon a pigmented ink unexpectedly good de-wetting properties, which causes improved ink droplet separation from the nozzle plate.

Oily and non-oily phospholipides may be employed in equal measure and demonstrate, independent of oil percentage, the same excellent properties as de-moistening additives. Preferentially employed phospholipides are Nathine 5-KE[R], Nathine 3-KE[R] (PE/PA-enriched de-oiled fractions) and Nathine 140 [R](PC enriched oily fractions).

It is of special importance that the phospholipides and their mixtures, whose known application field lies in the area of food products, possess no toxicity whatsoever with respect to humans or animals and can therefore be employed without any reservation in the ink according to the invention.

Thus, it is obvious that many different types of compounds are included in the term "phospholipides" whereby it is self-understood for a person skilled in the art that the term "phospholipide" includes every known phospholipide, and no limitation is intended with respect to the examples named in the present invention.

In addition to the described phospholipide, in the ink according to the invention, one or several normally in inkjet print technology employed pigments are used, i.e., it involves all coloring agents which are insoluble in the here employed solvent. Preferred are the "pigment dyes" which are specified in "The Color Index". A particularly preferred black pigment is carbon black. With respect to the ink according to the invention, pigment selection with a view toward the desired color effect is of importance. The color in the respective color shade and its intensity play a role as well as the required processing properties. Normally, pigment agglomerates are being used. These would normally not be suitable as such for the present purpose. These pigment agglomerates are therefore initially transported into the solvent.

In a number of individual applications, the present invention can make do without the use of customary dispersants, since the phospholipides regularly, on their own, produce adequate dispersion stability of the inkjet ink.

This applies specifically if the phospholipides is added prior to the wet dispersion (grinding) of the pigment powder. This beneficially leads to the phospholipide being settled at the pigment surface during the dispersion process, which prevents re-aggregation of pigment, which causes a stabilization of the dispersion. The exclusion of dispersants having unwelcome side effects while using phospholipides according to the invention also produces the benefit that the inkjet inks according to the invention do not show any health-detrimental effect, do not release ammonia, but make a possible satisfactory moisture-removal from jet plate coatings on the basis of fluorinated hydrocarbons with any further additive.

Subject to the conditions of excluding an additional dispersant, the inkjet ink according to the invention preferably contains 1 to 35% by weight, specifically approximately 5 to 30% by weight of one or several phospholipides. A particularly preferred inkjet ink according to the invention has the following composition in relation to total amount of solvent, dispersed pigment and phospholipides in the ink:

Approximately 50 to 97% by weight, specifically approximately 60 to 85% by weight of solvent, approximately 1 to 35% by weight, specifically approximately 5 to 30% by weight of one or several phospholipides and approximately 2 to 20% by weight, specifically approximately 4 to 15% by weight of pigment.

In individual instances, it may be of advantage—depending upon the respectively selected pigments or the insoluble coloring substances—to use an additional dispersant, which differs chemically from the likewise dispersive phospholipide employed according to the invention. By addition of such additional dispersant, the pigment agglomerates obtained during a grinding process (composed of a multitude of primary particles) are then appropriately and beneficially "ground down" to the individual primary particles. During this grinding process the dispersant settles on the surface of the primary particles with the result that a stable dispersion develops in the end.

The dispersant to be employed depends upon the individual application. There must be adjustment between the selected pigment on the one side and the respectively used solvent on the other side. In other words, the dispersant is an "adaptor" between pigment and solvent, so that the pigment is present in a stable dispersion. Such formulation presents no problem for the expert, whereby specifically the selection of the pigment type is relatively problem free. It is part of his technical knowledge to make here the appropriate adjustments, which is also possible by means of simple mechanical tests.

Thus, in selecting the dispersant one must, as a rule, take into consideration that the dispersant and the employed pigment engage in reciprocal interaction in the above explained mode. Beneficially, the dispersant with alkaline groups should be employed with a pigment containing the appropriate acid groups.

In a preferred specific embodiment, the ink according to the invention contains a dispersant in form of a co-polymer of vinyl-pyrrolidone with one or several long-chained α-olefins having at least 6 carbon atoms, specifically with 6 to 24 carbon atoms. Said amphiphilic polymer, based on physical/chemical interaction, settles on the surface of the pigment particles, whereby these are retained at the surface of the substrate, resulting in higher optical density with the same pigment concentration.

The solvent of the ink according to the invention is composed of at least 80%, specifically of at least approximately 95% and particularly preferred, essentially completely of homopolar, non-watery solvents. The selection of the solvent depends primarily upon the desired properties. The solvent must evaporate quickly, so that the ink dries, or must migrate with sufficient speed into the substrate so that the inter-mixing of ink is avoided and must, at the same time, possess no relevant toxicity.

With respect to formulation of the total system of pigment-dispersant-solvent, one should apply the general rules known to every person skilled in the art. It may be possible that the phospholipide employed within the scope of the invention will not work with every dispersant. Functionability only exists if the required affinity is present between all participants in the system. That means that the phospholipide must engage in interaction with the dispersant in such manner that the excess dispersant will have no moistening effect upon the nozzle plate. The above-defined solvent is largely homopolar. No free charges are available in the solvent. Thus, the solvent is essentially not in any interaction of the entire system.

It goes without saying that in addition to the components (a) to (d) further customary additives may be added, such as dispersant auxiliaries, surface-active substances (interlacing agents), resins and waxes. Further additives may also be employed for regulation of viscosity; the preferred viscosity of the ink according to the invention lies in the range of approximately 1 to 50 cSt.

The amount of pigment to be used largely depends upon its composition and preferably lies in the range of approximately 2 to 15% by weight in proportion to total amount of ink. The selected amount of dispersant is primarily based upon the type and amount of employed pigment, solvent and phospholipide and preferably lies approximately in the range from 5 to 25% by weight in proportion to total amount of ink. The ink according to the invention contains the phospholipide(s) in an effective amount, based on other components, which is as a rule in the range of approximately 0.05 to 25% by weight in proportion to total amount of ink, specifically in the range of approximately 0.01 to 20% by weight. Specifically preferred in the presence of phospholipide(s) in the ink in an amount of approximately 0.5 to 15% by weight in proportion to total amount of ink.

The additionally employed dispersant is beneficially selected relative to its chemical property in such manner that the essential benefits are preserved which are linked to the use of phospholipides as de-moistening agent and dispersant, specifically that there is no effect which is detrimental to health, that no ammonia is released, that excellent de-moistening of nozzle plate coatings is obtained without any additional additive, specifically on the basis of fluorinated hyrdocarbons. Furthermore, it has been shown that these inkjet inks according to the invention are also imprintable on absorbent materials, such as paper and cardboard. There is no essential limitation in the selection of the printer. Print tests with MIT-Uniprint printers indicate excellent printability. Accordingly, all printers with MIT printhead are suitable for printing with the inkjet ink according to the invention. Suitable as well are printers which are capable of printing with oil-based inks.

The invention is explained in greater detail based on the following examples:

EXAMPLE 1 to 8

An ink is being prepared according the following recipe. Contained in it is EXXSOL D-140 a mixture of aliphatic hydrocarbons by Exxon with a boiling point of 287°C1 Antaro V-216 is a PVP-Hexadecene-Co-polymer by GAF Chemicals, Switzerland, Elftex 495 is a carbon black pigment by Cabot Corporation (in this case the concentrated charging materials were initially reduced in an agitator ball mill and subsequently diluted to above composition):

| | |
|---|---|
| EXXSOL D-140 | 82.2% by weight |
| Antaron V-216 | 10.2% by weight |
| Elftex 495 | 7.6% by weight |

Eight ink samples are taken from this ink (ink numbers 1 to 8) which are respectively mixed with 0.05, 0.25, 0.5, 1.0, 1.5, 2.0, 5.0 and 10.0 Nathine 5-KE$^R$% by weight. A strip of polyamide measuring 5 cm×1 cm, coated with fluor-silane, is dipped into the appropriate ink and the required time (in seconds) for de-moistening (droplet separation) with high optical density is measured after 3 hours, after one day, four days and 7 days. If the run-off time surpasses 60 seconds, the percentage-wise de-moistened surface is additionally shown in brackets. The results are listed in TABLE II which follows:

TABLE II

| Ink No. | 0 | 1 | 2 | 3 | 4 | 5 | 6 | 7 | 8 |
|---|---|---|---|---|---|---|---|---|---|
| % by weight of Nathinee 5KE$^R$ De-moistening in seconds after: | 0 | 0.05 | 0.25 | 0.5 | 1 | 1.5 | 2 | 5 | 10 |
| 3 hours | 30 | 8 | 4 | 4 | 5 | 6 | 7 | 8 | 8 |
| 1 day | >60 (10%) | 25 | 11 | 11 | 10 | 10 | 12 | 17 | 17 |
| 4 days | >60 (0%) | >60 (15%) | 25 | 25 | 30 | 30 | 30 | 40 | 60 |
| 7 days | >60 (0%) | >60 (5%) | 25 | 25 | 30 | 30 | 35 | 40 | >60 (80%) |

EXAMPLES 9–15

Seven ink samples are taken from the ink having the same composition as in examples 1–8, (ink numbers 9 to 15) which are respectively mixed with 0.05, 0.5, 1.0, 2.0, 4.0, 8.0 and 16.0 Nathine 3-KE$^R$% by weight. A strip of polyamide measuring 5 cm×1 cm, coated with a fluor-saline, is dipped into the appropriate ink and the required time (in seconds) for de-moistening is measured after 3 hours, after one day, four days and 7 days. Ink No. 0 having the same composition but without addition of de-moistening additive is listed for comparison purposes, as explained above. The results are listed in the following Table III:

TABLE III

| Ink No. | 0 | 9 | 10 | 11 | 12 | 13 | 14 | 15 |
|---|---|---|---|---|---|---|---|---|
| % by weight of Nathine 3-KE$^R$ De-moistening in seconds after: | 0 | 0.05 | 0.25 | 0.5 | 1 | 1.5 | 2 | 5 |
| 3 hours | 30 | 5 | 4 | 4 | 4 | 5 | 6 | 7 |
| 1 day | >60 (10%) | 10 | 7 | 10 | 10 | 12 | 15 | 15 |
| 4 days | >60 (0%) | 30 | 17 | 20 | 18 | 19 | 20 | 17 |
| 7 days | >60 (0%) | 40 | 20 | 30 | 28 | 30 | 35 | 30 |

EXAMPLES 16 to 22

Seven ink samples are taken from the ink having the same composition as in examples 1–8, (Ink Nos. 16 to 22) which are respectively mixed with 0.05, 0.5, 1.0, 2.0, 4.0, 8.0 and 16.0 Nathine 140$^R$% by weight. A strip of polyamide measuring 5 cm×1 cm, coated with a fluo-saline, is dipped into the appropriate ink and the required time (in seconds) for de-moistening is measured after 3 hours, after one day, four days, and 7 days. If the run-off time surpasses 60 seconds, the percentage-wise de-moistened surface is additionally shown in brackets. The results are listed in TABLE IV which follows:

TABLE IV

| Ink No. | 0 | 16 | 17 | 18 | 19 | 20 | 21 | 22 |
|---|---|---|---|---|---|---|---|---|
| % by weight of Nathine 140$^R$ De-moistening in seconds after: | 0 | 0.05 | 0.5 | 1 | 2 | 4 | 8 | 16 |
| 3 hours | 30 | 7 | 4 | 4 | 4 | 6 | 6 | 9 |
| 1 day | >60 (10%) | 50 | 25 | 20 | 20 | 22 | 16 | 13 |
| 4 days | >60 (0%) | >60 (5%) | >60 (20%) | >60 (30%) | >60 (20%) | >60 (60%) | >60 (90%) | 45 |
| 7 days | >60 (0%) | >60 (2%) | >60 (10%) | >60 (20%) | >60 (20%) | >60 (30%) | >60 (60%) | 50 |

Comparative Examples V1 to V3

The ink having the same composition as in Examples 1 to 8 is mixed in a quantity of 1.0, 1.5 and 5.0% by weight with the neutralizing agent Uravar FN5, described in WO97/15633, and measurements are taken under the same conditions as described for examples 1 to 22. The results are compiled in Table VI.

TABLE VI

| Ink No. | V1 | V2 | V3 |
| --- | --- | --- | --- |
| % by weight of Uravar FN5 in seconds after: | 1 | 1.5 | 5 |
| 3 hours | 8 | 8 | >60 (0%) |
| 1 day | 7 | 8 | >60 (0%) |
| 4 days | 11 | 12 | >60 (0%) |
| 7 days | 12 | 14 | >60 (0%) |

In summarizing the results of the above Tables II to V it is immediately evident that the inks according to the invention with phospholipide addition possess excellent de-moistening properties. Specifically with very small quantities, outstanding unaltered properties with respect to de-wetting of the ink and a de-wetting additive are evident after several weeks according to the invention.

With use of Uravar FN5 (Table VI) de-moistening properties are ascertained only within very narrow limitations, which would have to be determined first by extensive tests for each ink. Long term testing also shows that Uravar FN5 is not suitable as a de-wetting additive.

EXAMPLE 23

The inks were applied under slight pressure by means of a sponge to a strip of polyamide which had been coated with fluosilane. With ink No. 0 (without addition), a slight, whitish, thin film develops on which the ink no longer runs off satisfactorily. With inks Nos. 7, 12, 13, 15 and 22, there occurred only little film formation, if at all, all inks have good run-off properties. With ink V2, said film forms in greater presence, the ink is almost devoid of run-off property.

Example 23 clearly shows that Uravar FN5 causes deterioration of the run-off property, whereas phospholipides continue to improve the run-off property. Furthermore, over time, inks with Uravar FN5 become thicker. This effect becomes particularly evident with ink V3. Uravar FN5 is not suited as a de-wetting additive over the long term and outside of the narrow quantity ranges.

EXAMPLE 24

An ink is prepared according to the following recipe. The components consist of EXXSOL D-140, a mixture of aliphatic hydrocarbons by Exxon with a boiling point of 287° C., Paliotol yellow D1155, a yellow pigment by BASF and Nathine 3KE, a PE/PA enriched de-oiled fraction of phospholipides by the Stern Company:

| | |
| --- | --- |
| EXXSOL D-140 | 87.0% by weight |
| Nathine 3KE | 8.0% by weight |
| Paliotol yellow D1155 | 5.0% by weight |

In an agitator ball mill, a starter batch is wet-dispersed for several hours (reduced by grinding): 12.5% pigment by weight, 20% Nathine 3KE by weight (dispersing element) and 67.5% Exxsol D140. Subsequently, one dilutes to the above specified final composition.

De-moisturizing tests were performed with this ink, the same performed, for example, with the inks of Examples 1 to 8. Here again, the time needed for de-wetting (droplet run-off) of ink (in seconds) is measured after 3 hours, one day, 4 days and 7 days. The results were as follows:

After 3 hours: 10 seconds
After 1 day: 22 seconds
After 4 days: 34 seconds
After 7 days: 40 seconds

We claim:

1. Inkjet ink, containing:
   (a) a solvent, which contains at least 80% of a homopolar, non-watery solvent,
   (b) a pigment dispersed in the solvent,
   (c) one or several nathine-phospholipides.

2. Inkjet ink according to claim 1, wherein it contains a dispersant.

3. Inkjet ink according to claim 1, wherein the phospholipide is present in form of a lecithin.

4. Inkjet ink according to claim 3, wherein the phospholipide is present in form of lecithin fraction.

5. Inkjet ink according to claim 2, wherein the phospholipide is present in a quantity of approximately 0.05 to 25% by weight in proportion to total amount of ink, specifically in a quantity of approximately 0.1 to 20% by weight.

6. Inkjet ink according to claim 5, wherein the phospholipide is present in a quantity of approximately 0.5 to 15% by weight.

7. Inkjet ink according to claim 2, wherein the dispersant is present in the form of a co-polymer of vinylpyrrolidone with one or several long-chained α-olefins with at least 6 carbon atoms.

8. Inkjet ink according to claim 2, wherein it contains relative to total quantity, solvents, dispersant, dispersed pigment and one or several phospholipides in the ink:
   a) approximately 60 to 90% by weight of solvent, which contains at least 80% homopolar, non-watery solvent,
   b) approximately 2 to 15% by weight of dispersed pigment,
   c) approximately 0.05 to 25% by weight of one or several phospholipides, and,
   d) approximately 5 to 25% by weight of dispersant.

9. Inkjet ink according to claim 1, wherein the inkjet ink contains approximately 1 to 35% by weight of one or several nathine-phospholipides.

10. Inkjet ink according to claim 1, wherein it contains, relative to total amount of solvent, dispersed pigment and phospholipide in the ink:
   a) approximately 50 to 97% by weight of solvent which contains at least 80% of a homopolar, non-watery solvent,
   b) approximately 2 to 20% by weight of pigment, c) approximately 1 to 35% by weight of one or several phospholipides.

11. Inkjet ink according to claim 7, wherein the dispersant is present in the form of a co-polymer of vinylpyrrolidone with one or several long-chained α-olefins with 6 to 24 carbon atoms.

12. Inkjet ink according to claim 9, wherein the inkjet ink contains approximately 5 to 30% by weight of one or several nathine-phospholipides.

* * * * *